May 24, 1938.  R. J. BUSH  2,118,427
BRAKE SWITCH DEVICE
Original Filed May 20, 1936   2 Sheets-Sheet 1

INVENTOR
RANKIN J. BUSH
BY *Wm. H. Cady*
ATTORNEY

May 24, 1938.  R. J. BUSH  2,118,427
BRAKE SWITCH DEVICE
Original Filed May 20, 1936  2 Sheets-Sheet 2
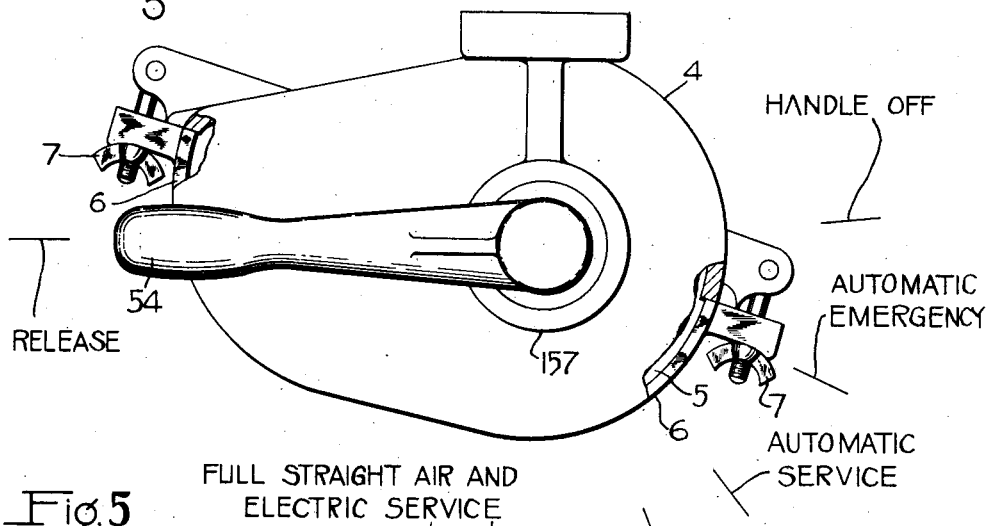
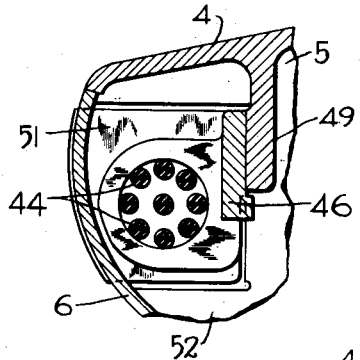
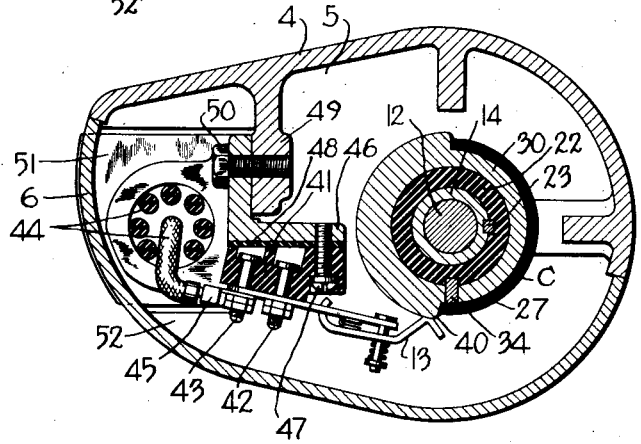
INVENTOR
RANKIN J. BUSH
BY
ATTORNEY Patented May 24, 1938

2,118,427

UNITED STATES PATENT OFFICE 2,118,427

BRAKE SWITCH DEVICE

Rankin J. Bush, Jeannette, Pa., assignor to The Westinghouse Air Brake Company, Wilmerding, Pa., a corporation of Pennsylvania Original application May 20, 1936, Serial No. 80,785. Divided and this application October 16, 1936, Serial No. 105,972

3 Claims. (Cl. 247—9)

This invention relates to brake controllers or switch devices and is a division of my pending application, Serial No. 80,785, filed May 20, 1936.

The principal object of the invention is to provide an improved switch structure particularly adapted, though not limited, for use in connection with manually operated brake controllers of the type employed for controlling a brake system on a vehicle.

Other objects and advantages will be apparent from the following more detailed description of the invention.

Figure 1:
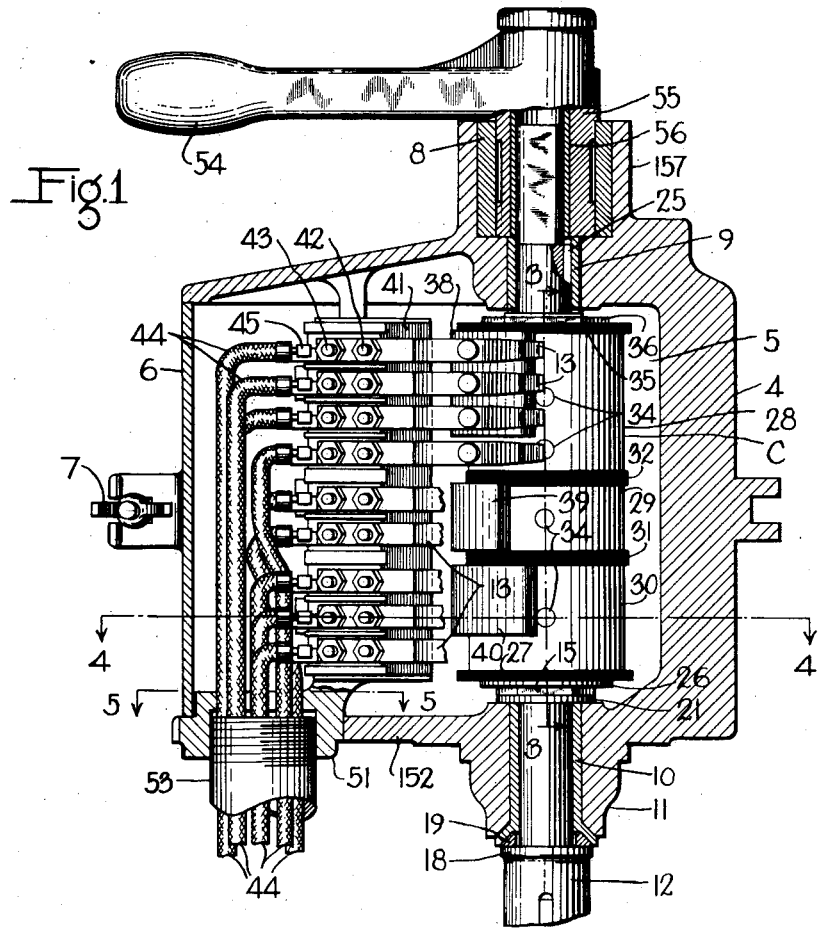
Figure 3:
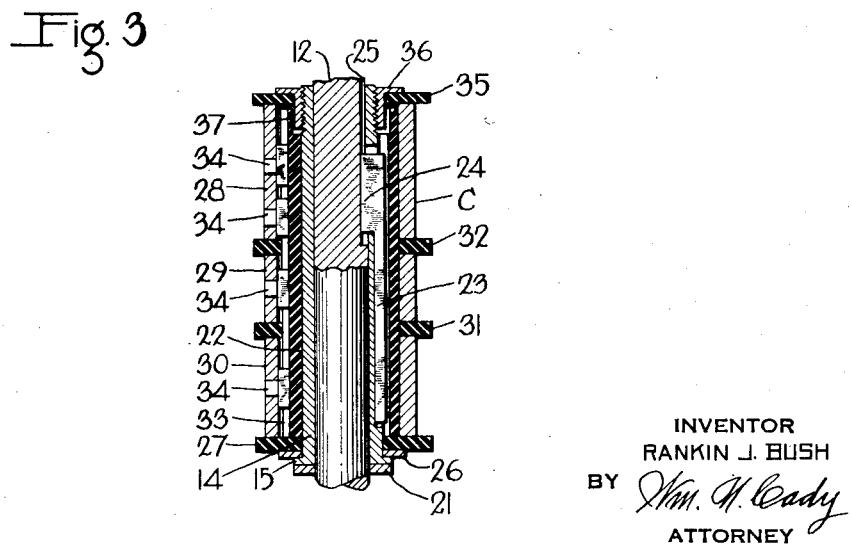

In the accompanying drawings; Fig. 1 is a vertical, sectional view of a portion of a manually operated brake controller embodying the improved switch structure which is shown therein in side elevation; Fig. 2 is a plan view, partly in section of the portion of the controller shown in Fig. 1; and Figs. 3, 4 and 5 are sectional views taken on the lines 3—3, 4—4, and 5—5 in Fig. 1.

In the drawings, only that portion of the brake controller which is pertinent to the invention is shown and said portion comprises a casing 4 having a chamber 5 one side wall of which is formed by a removable cover 6 normally secured to said casing by means of thumb screws 7.

The casing 4 is provided with an upwardly extending projection 157 having a bore lined with a vertically disposed sleeve 8 which is open at both ends. A bushing 9 is provided in the top wall of casing 4 and has a bore in axial alignment with that of sleeve 8. A bushing 10 is provided in a suitable bore which extends through the bottom wall of casing 4 and through a depending portion 11 of said casing, said bushing having a bore in axial alignment with that through bushing 9. An operating shaft 12 is disposed to rotate in the bushings 9 and 10 and extends through chamber 5 and sleeve 8. The lower end of the shaft 12 is provided with an annular flange 18 between which and the lower flared end of bushing 10 is disposed a sealing washer 19. A spring (not shown) is provided for urging the flange 18 against the washer 19 and thereby defining the normal position of the shaft 12.

A rotatable contactor or drum C is secured to the shaft 12 in chamber 5 between the spaced bushings 9 and 10 and is adapted to be rotated by said shaft for making and breaking electrical contacts with a plurality of spaced, stationary, flexible contact fingers 13 through the medium of which the electric brakes on a vehicle are adapted to be controlled.

The contactor C comprises a sleeve 14, preferably made of a wear resisting material such as steel, slidably mounted on the shaft 12 and having at its lower end an outwardly extending annular flange 15 between which and the casing is interposed a bearing washer 21.

A sleeve 22, made of any suitable electrical insulating material, is slidably mounted on the sleeve 14 and is secured thereto against relative rotational movement by means of a key 23 which is disposed in aligned slots in the sleeves 14 and 22. The key 23 is provided adjacent one end with a tongue 24 which extends through the wall of sleeve 14 and into a slot 25 in the shaft 12 whereby the sleeve 14 is secured to the shaft against relative rotational movement. The slot 25 is open at its upper end as clearly shown in Fig. 1 of the drawings.

A metal supporting washer 26 is disposed over the sleeve 14 in engagement with the flange 15 of said sleeve and an insulating ring 27 of greater diameter than the sleeve 22 is interposed between the lower end of said sleeve and the washer 26.

Three ring like contact members or conductors 28, 29 and 30 are slidably mounted on the sleeve 22 with the contact member 30 engaging the insulating ring 27 and with an insulating ring 31 interposed between the contact members 29 and 30 and a like insulating ring 32 between the contact members 29 and 28.

The sleeve 22 is provided externally with a longitudinally extending slot 33 and each of the contact members 28, 29 and 30 is provided with a slot aligned with the slot 33. Each of the contact members 28, 29 and 30 is secured to the sleeve 22 against relative rotational movement by a key 34 which has a head portion disposed in slot 33 and the aligned slot in the respective contact member, the key also having a stem portion projecting into a suitable bore in the respective contact member for holding the key in position in the contact member. On account of the length of the contact member 28 two keys 34 are employed for the purpose just described.

An insulating ring 35 is disposed over the upper end of the sleeve 14 in engagement with the contact member 28, while a clamping nut having a flange 36 engaging the outer face of the ring 35 is provided with a sleeve 37 screw threaded to the end of sleeve 14 whereby the several contact members and insulating rings are securely clamped together between the flange 15 on one end of said sleeve and the flange 36 on the nut secured to the other end of said sleeve.

Before the contactor C is mounted on the shaft 12, the insulating sleeve 22, the contact members 28, 29 and 30, the insulating rings 27, 31, 32 and 35 and other parts forming this structure are adapted to be assembled and secured in place on the metal sleeve 14. Then with the shaft 12 removed from the casing 4, the assembled contactor C is placed in position in the casing 4. The shaft 12 is then inserted through the bushing 10 and into the contactor sleeve 14. The tongue 24 of key 23 in the contactor C is then lined up with the keyway or slot 25 in the shaft 12 following which the shaft is pushed through the contactor C and through the upper bushing 9 until the flange 18 on the lower end of said shaft is stopped by the sealing washer 19 which engages the lower flared end of the bushing 19. The shaft 12 is then held in this position by the spring hereinbefore referred to.

It will be noted that the contactor C is built up or assembled from a plurality of simply constructed elements which provides a structure that is relatively simple and inexpensive to manufacture as compared to prior designs in which all parts of the contactor are molded or otherwise formed in one piece.

The contact members 28, 29 and 30 are provided with raised portions 38, 39 and 40, respectively, for engagement with the contact finger or fingers 34 which are aligned therewith. These raised portions are particularly located with respect to the location of the key 34 associated with each contactor so as to engage the contact finger or fingers 34 in the desired position of the drum. These raised portions are also of such width as to engage only the number of contact fingers desired. It will be evident that due to the built up structure of the contactor C, the position of contact members 28, 29 and 30 may be changed, or contactor members having raised portions such as 38, 39 and 40 located differently with respect to keys 34 may be employed, or contact members of different widths than shown in the drawings may be used, and even a greater number of contact members as, limited by the space between the insulating rings 27 and 35, may be used if desired, whereby any desired control of electric brakes, circuit breakers or the like may be obtained.

As an example of this adjustability of the contactor C to meet desired variations of control, it will be noted that the raised portion 40 on the contact member 30 is only wide enough to engage two contact fingers 13, whereas, if conditions required, a different contact member having a raised portion for engaging the three fingers 13 in line therewith might be employed in place of the contact member 30.

The flexible contact fingers 13 are spaced on and secured to a block 41 of insulating material by means of bolts 42 and 43, and each of these fingers is connected to a cable or electrical conductor 44 by means of a clip 45 secured to the respective conductor and finger by the bolt 43.

The insulating block 41 is secured to one leg of an L shaped member 46 by means of one or more screws 47, and between said block and leg is interposed an insulating plate 48. The other leg of member 46 is secured to a vertically disposed web 49 projecting into chamber 5 from the rear wall of the casing 4, by means of one or more screws 50.

The L shaped member 46 is provided on its lower end with a horizontally disposed, offset portion 51 which fits into an opening provided through the bottom wall 52 of the casing. This offset portion is provided with a vertically arranged opening in the outer end of which a cable conduit 53 is secured by screw threaded engagement. The several conductors 44 are carried through this conduit into the chamber 5 wherein each is connected to its respective finger 13 as above described.

With the L shaped member 46 and the associated offset portion 51 secured in position to the casing 4, and the removable cover 6 secured in place to said casing by means of the thumb screws 7, it will be noted that the electrical control portion of the brake controller is entirely enclosed within the chamber 5.

An important feature of the construction just described is that upon removal of the cover 6 and the bolt or bolts 50 which secured the L shaped member 46 to the casing web 49, the contact finger assembly, which includes the contact fingers 13, the insulating block 41, the L shaped member 46 and its offset portion 51, is then removable from the controller as a unit which facilitate changes in or rearrangement of parts thereof or replacement of parts thereof or of the contactor C.

A handle 54 is provided for turning the shaft 12 and thereby contactor C relative to fingers 13 for making and breaking circuits controlled by said contactor and fingers, in the desired manner. The handle 54 is provided with a socket portion 55 which has a bore lined with a sleeve 56 having an axial, polygonal shaped opening adapted to slidably receive the similarly shaped upper end of the shaft 12 whereby a driving connection is obtained between the handle 54 and shaft 12. Due to the sliding fit of socket 55 on the end of shaft 12, it will be evident that the handle may be applied to said shaft or removed therefrom, as desired.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In combination, a casing having a chamber open at one side and having in an adjacent side an opening open at one end to the open side of said chamber, a removable cover adapted to be secured to said casing closing the open side of said chamber and the open end of said opening, an element disposed in said chamber, removable means securing said element to said casing, said element having a portion disposed in and closing said opening in said casing, a plurality of spaced contact fingers carried by said element in operative relation with the contacts of a movable contactor disposed in said casing, and an electrical conductor connected to each of said fingers and extending to the outside of said casing through an opening in the portion of said element which closes said opening in the casing.

2. In combination, a casing having a chamber open at one side and having in an adjacent side an opening open at one end to the open side of said chamber, a removable cover adapted to be secured to said casing closing the open side of said chamber and the open end of said opening, an element disposed in said chamber, removable means securing said element to said casing, said element having a portion disposed in and closing said opening in said casing, an insulating member, means securing said member to said element, a plurality of contact fingers spaced on said insulating member in operative relation with the contacts of a movable contactor disposed in said casing, means securing said fingers to said insulating member, and an electrical conductor connected to each of said fingers and extending to the outside of the casing through an opening in the portion of said element which closes said opening in the casing.

3. In combination, a casing having a chamber open at one side and having in an adjacent side an opening open at one end to the open side of said chamber, a removable cover adapted to be secured to said casing closing the open side of said chamber and the open end of said opening, an element disposed in said chamber, removable means securing said element to said casing, said element having an offset portion disposed in and closing said opening in said casing, a conduit disposed outside of said casing and secured to said offset portion and open to said chamber, an insulating member secured to said element, a plurality of contact fingers secured to said element in operative relation with the contacts of a movable contactor carried by said casing, and an electrical conductor connected to each of said fingers and extending through said conduit to the outside of said casing.

RANKIN J. BUSH.